(12) United States Patent
Riepertinger

(10) Patent No.: US 7,446,305 B2
(45) Date of Patent: Nov. 4, 2008

(54) ANGLE-MEASURING INSTRUMENT HAVING A SPACER FOR POSITIONING A CAP RELATIVE TO A PRINTED CIRCUIT BOARD

(75) Inventor: Sebastian Riepertinger, Söchtenau (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/301,676

(22) Filed: Dec. 13, 2005

(65) Prior Publication Data

US 2006/0131490 A1   Jun. 22, 2006

(30) Foreign Application Priority Data

Dec. 17, 2004   (DE) .................. 10 2004 060 864

(51) Int. Cl.
*G01D 5/34* (2006.01)
(52) U.S. Cl. .................. 250/231.13; 250/231.14; 356/617; 33/1 N
(58) Field of Classification Search ................. 250/231.13–231.18, 239; 33/1 PT, 1 N, 33/1 L; 359/566; 356/614, 616, 617; 341/11, 341/13; 257/678, 698, 704, 707, 730
See application file for complete search history.

(56) References Cited

U.S. PATENT DOCUMENTS

| | | | |
|---|---|---|---|
| 5,708,496 A * | 1/1998 | Barnett et al. .................. 356/28 |
| 6,291,914 B1 * | 9/2001 | Mukaiyama .............. 310/68 B |
| 6,617,571 B2 * | 9/2003 | Thaler et al. ........... 250/231.13 |
| 6,919,558 B2 * | 7/2005 | Feneis et al. ........... 250/231.13 |

* cited by examiner

Primary Examiner—Georgia Y. Epps
Assistant Examiner—Francis M Legasse, Jr.
(74) Attorney, Agent, or Firm—Brinks Hofer Gilson & Lione

(57) ABSTRACT

An angle-measuring instrument including a cap defining an opening and a base body that is covered by the cap. A printed circuit board positioned on the base body and on which an electrical coupling element is fixed in place. A spacer that aids in positioning the cap in such a way relative to the printed circuit board so that the opening is aligned with respect to the electrical coupling element.

11 Claims, 3 Drawing Sheets

ANGLE-MEASURING INSTRUMENT HAVING A SPACER FOR POSITIONING A CAP RELATIVE TO A PRINTED CIRCUIT BOARD

Applicant claims, under 35 U.S.C. § 119, the benefit of priority of the filing date of Dec. 17, 2004 of a German patent application, copy attached, Serial Number 10 2004 060 864.4, filed on the aforementioned date, the entire contents of which is incorporated herein by reference.

BACKGROUND OF THE INVENTION

1. Field of the Invention

The present invention relates to an angle-measuring instrument comprised of a cap with an opening, as well as a base body and a printed circuit board, on which an electrical coupling element is fixed.

2. Discussion of Related Art

Angle-measuring instruments, often also called angle encoders, are used for measuring rotary movements of a rotatably seated body, in particular a shaft, during one or several rotations (multi-turn mode of functioning). Here, the rotary movement is detected incrementally or absolutely. Linear movements can also be measured by an angle-measuring instrument in connection with toothed rods, gears or threaded spindles.

An operating voltage is supplied to the angle-measuring instrument; the measurement signals are picked up and passed on to an electronic follow-up device via connecting lines. In known angle-measuring instruments, an opening is provided in a cap of the angle-measuring instrument, through which the connecting cable can be passed to the angle-measuring instrument and there brought into contact with a suitable electrical connecting unit.

OBJECTS AND SUMMARY OF THE INVENTION

An object of the present invention is based on providing an angle-measuring instrument of the type mentioned at the outset which, with simple design, allows a dependable and rapid assembly, wherein the angle-measuring instrument can be well sealed against the outside and an electrical coupling at the angle-measuring instrument operates dependably.

In accordance with the present invention, this object is attained by creating an angle-measuring instrument including a cap defining an opening and a base body that is covered by the cap. A printed circuit board positioned on the base body and on which an electrical coupling element is fixed in place. A spacer that aids in positioning the cap in such a way relative to the printed circuit board so that the opening is aligned with respect to the electrical coupling element.

In accordance therewith at least one spacer is provided for optimizing the easy running and functioning of an electrical coupling, as well as for improving the seal of the angle-measuring instrument, with whose aid the cap can be positioned with respect to the printed circuit board in such a way that the opening is aligned in relation to the electrical coupling element. By this exact spatial assignment of the cap to the printed circuit board it is possible to achieve a high degree of sealing in the area of the electrical coupling in a reproducible manner.

The angle-measuring instrument furthermore has structure with which a clear association with respect to the angular position of the cap and an electrical coupling element is assured in the end. The above mentioned structure is, for example, a positive connection between a base body of the angle-measuring instrument and the cap. Alternatively to this it is also possible to attach alignment pins directly to the cap (or they can be a part of the cap), which ensure an angularly correct assembly, together with corresponding bores in the printed circuit board. The cap therefore has elements here which work together directly with the printed circuit board in such a way that a relative angular position between the cap and the printed circuit board can be fixed by a positive connection.

Often such angle-measuring instruments are components of a data network, for example with an ethernet architecture, to which they send measurement data, but also receive data from it. Therefore often known network plugs or network sockets are used in this connection as electrical coupling elements, for example so-called RJ45 plugs, or corresponding sockets.

In accordance with a further aspect of the present invention, the angle-measuring instrument includes at least one additional contact element for making an electrical connection with one or several signal lines. The contact element is designed in such a way that the angle-measuring instrument in its entirety can be installed in at least two different positions while providing the same functions. To this end, the corresponding contact elements can be embodied as ring contacts. In accordance with a further advantageous variation, the contact elements can furthermore be designed as sheet metal elements. Alternatively to this the contact elements can also be defined by strip conductors or pads on a printed circuit board located in the end area of the angle-measuring instrument.

The end of the external signal line which works together with the contact element is advantageously designed as a resilient structural component in order to make possible a dependable electrical contact.

Further characteristics and advantages of the present invention will become apparent in the course of the following description of an exemplary embodiment by the drawings.

DETAILED DESCRIPTION OF THE PREFERRED EMBODIMENTS

Figure 1:
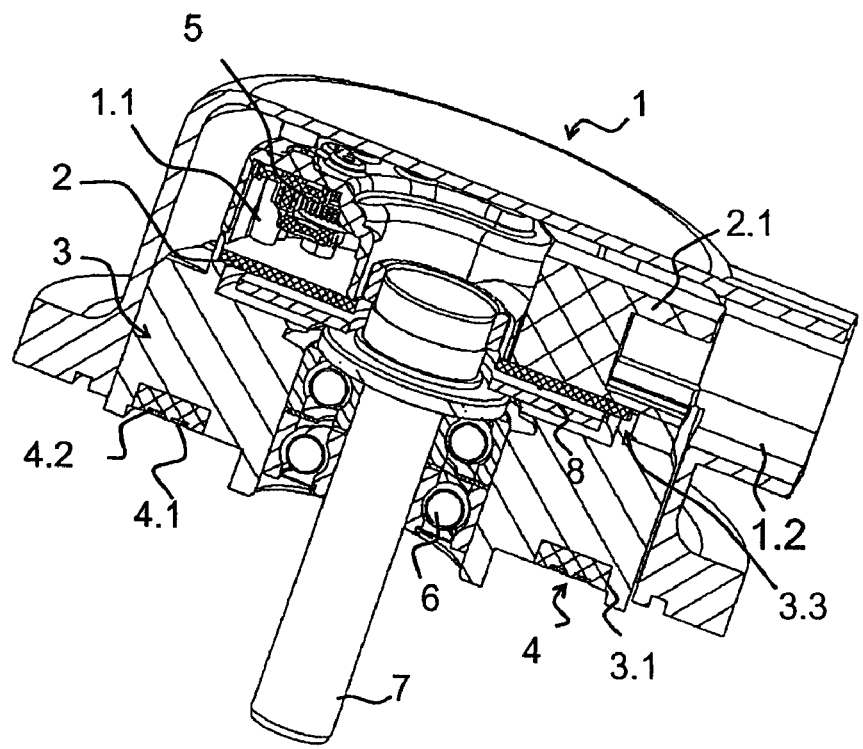
FIG. 1 is a perspective sectional plan view of an embodiment of an angle-measuring instrument in accordance with the present invention.
Figure 2:
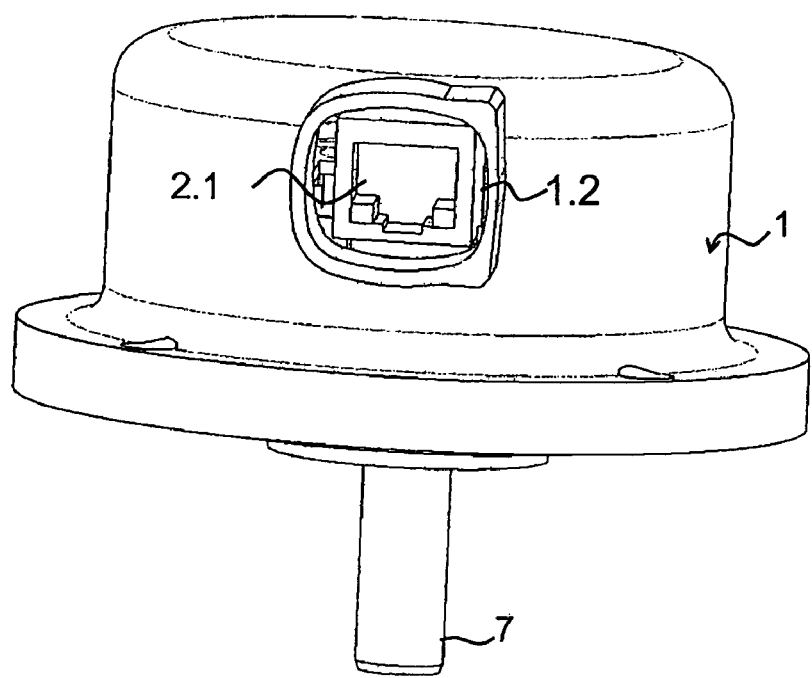
FIG. 2 is a perspective plan view of the angle-measuring instrument of FIG. 1.
Figure 3:
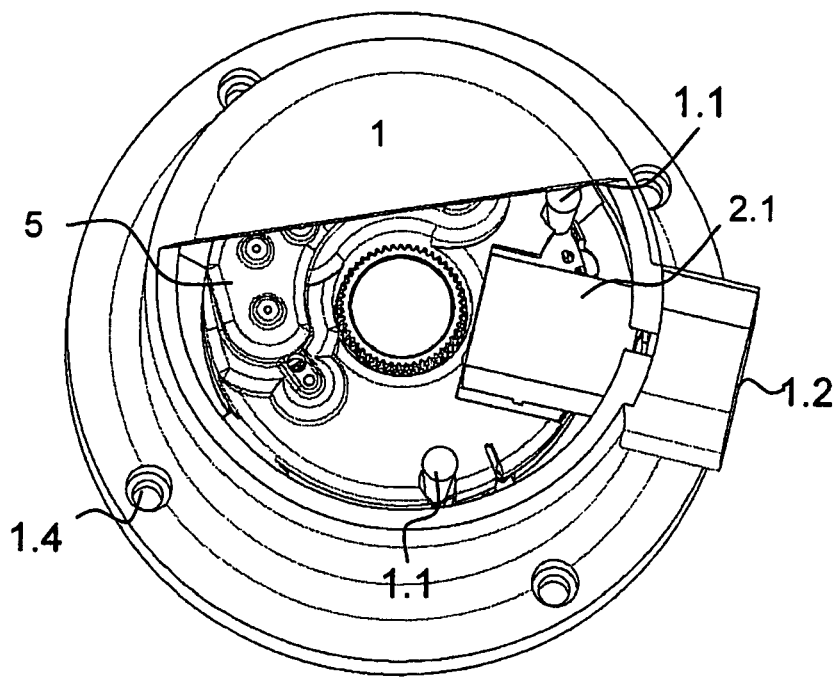
FIG. 3 is a perspective plan view of the angle-measuring instrument with an embodiment of a cap in a sectional view in accordance with the present invention.

The angle-measuring instrument represented in FIGS. 1 to 5 has a shaft 7 for a connection with a body to be measured. The angle-measuring instrument itself is fastened via a cap 1 on a further body by flange bores 1.4. The body to be measured is a motor shaft, for example, and the further body a stationary motor housing. Angle-measuring instruments designed for these applications are also often called angle encoders. In the exemplary embodiment represented, the angle-measuring instrument is constructed in such a way that its cap 1 includes a component of the outer contour of the motor after it has been installed on a motor housing. In other words, the angle-measuring instrument is not enclosed in a further housing element, instead it defines the outer contour of the motor after it has been mounted on it.

The angle-measuring instrument includes a base body 3, which has a recess 3.1, into which a ring-shaped non-conducting insulating body 4 has been placed. A first ring contact 4.1 and a second ring contact 4.2 are located in this insulating body and include an electrically conductive material. The ring contacts 4.1, 4.2 are concentrically arranged in relation to the shaft 7.

The shaft 7 is rotatably seated in a known manner in the base body 3 with the aid of bearings 6, wherein a code disk 8 arranged in the interior of the angle-measuring instrument is fastened on the shaft 7, and the shaft 7 drives one or several further code disks via a gear 5. A multi-turn mode of functioning is achieved by the gear 5 and the further code disks.

The code disk 8 in the example represented is photo-electrically scanned by a scanning device. Corresponding light-sensitive detectors are located on a printed circuit board 2 on which, inter alia, electrical components for signal formation—for example amplifying and digitizing—of the scanning signals provided by the detectors are arranged. Besides this electronic measuring arrangement, an electrical coupling element is furthermore located on the printed circuit board, in the example shown a socket 2.1, in which an RJ45 plug can be received in the exemplary embodiment represented. The socket 2.1 is positioned in an exactly fitting manner on the printed circuit board 2.

Figure 4:
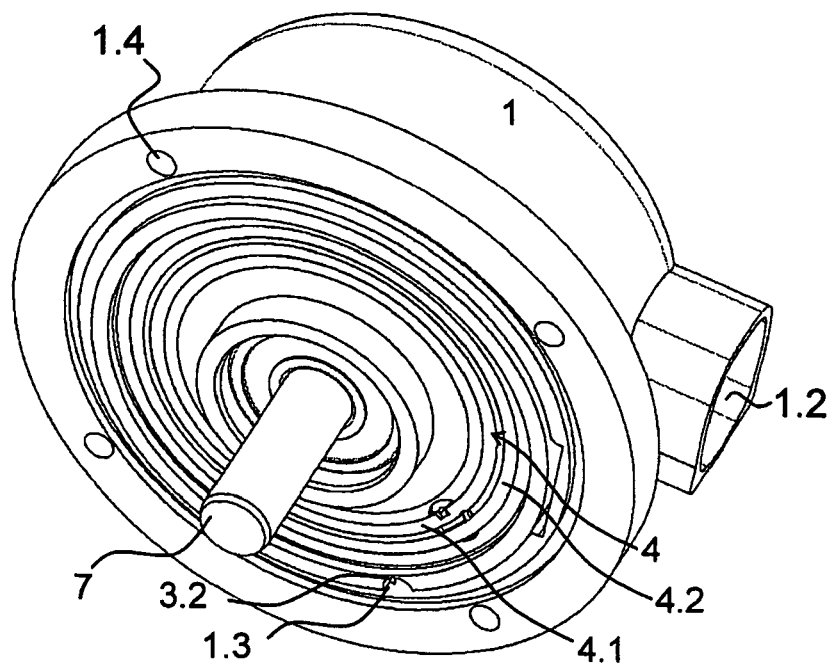
FIG. 4 is a further perspective sectional plan view of the angle-measuring instrument of FIG. 1.
Figure 5:
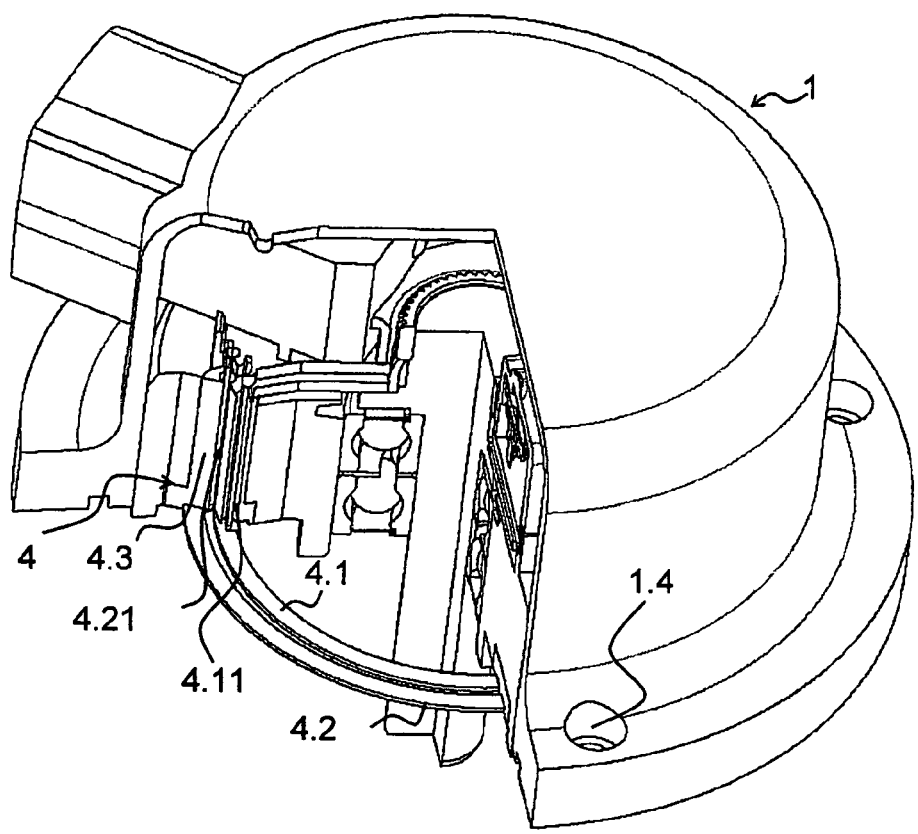
FIG. 5 is a further perspective plan view of the angle-measuring instrument of FIG. 1 with the cap in a sectional view.

The cup-shaped cap 1 is provided for the protection of the angle-measuring instrument and its electronic measuring arrangement, which is fastened on the base body 3 by being clamped over the circumference. In the example represented, this connection is a press connection. So that an unequivocal assignment with respect to the angular position between the cap 1 and the base body 3 is assured, the base body 3 has a fitting recess 3.2. The cap 1 is oriented in such a way in the course of assembly, that a protrusion 1.3 is received in the fitting recess 3.2 (FIG. 4). The cap 1 furthermore has three spacers 1.1 as integral components, as well as an opening 1.2. In the exemplary embodiment represented, the cap 1 is designed as a molded element, wherein for increasing the dimensional accuracy of the length of the spacers 1.1 their end faces had been machined. An extremely accurate position of the end faces of the spacers 1.1 in relation to the opening 1.2 is achieved in this way.

An appropriate plug can be inserted into the socket 2.1 through the opening 1.2. The wall of the opening 1.2 is simultaneously used as a guide for the plug.

Such angle-measuring instruments, or angle encoders, are often employed in comparatively rough industrial environments, because of which it is important that the cap 1 sealingly encloses the interior of the angle-measuring instrument. In this connection, the area of the plug connection, or of the opening 1.2 and socket 2.1, is particularly critical. It is not possible to achieve a high degree of seal in this area if the position of the socket 2.1 in relation to the opening 1.2 in the cap 1 has tolerances that are too large.

As already mentioned, the socket 2.1 is placed in an exactly fitting manner on the printed circuit board 2, but the printed circuit board itself has tolerances in regard to its being level and to its thickness. These tolerances are comparatively large. For this reason, a plug of conventional construction could be in general be positioned obliquely or tilted in relation the socket 2.1 through the opening 1.2 used as a guide. This tilting can be so large that the plug connection cannot be made, or creates electrically unreliable contacts. Moreover, even if a plug connection can still be established, open gaps can be created in the area of the plug connection, which result in leaks.

An exact spatial coordination between the socket 2.1 and the opening 1.2 is now achieved in that the spacers 1.1 are supported on the printed circuit board 2. The printed circuit board 2 itself rests on a printed circuit board support which, in the exemplary embodiment represented, is embodied as a collar 3.3 extending around the interior of the base body 3. The thickness tolerances of the printed circuit board 2 are evened out in this way, so that the opening 1.2 is placed in exactly the right position in relation to the socket 2.1 in the direction of the shaft 7.

Moreover, the base body 3 is structurally designed in such a way that the printed circuit board can only be mounted in the angle-measuring instrument in a specific angular position (in relation to the axis of the shaft 7). Added to this is that, as already mentioned, by the fitting recess 3.2 and the protrusion 1.3 an unequivocal correspondence between the cap 1 and the base body 3 with respect to the angular position is assured. In this way an exactly fitting installation of the plug in the socket 2.1 is also achieved in the tangential direction.

Often angle-measuring instruments or angle encoders are connected with their surroundings not only through the plug connection for which the socket 2.1 is provided. Moreover, electrical signals are fed to the angle-measuring instrument through separate lines coming from the exterior. Such signals can, for example, stem from a temperature sensor in a motor to which the angle-measuring instrument, or the cap 1 is flanged. In accordance with FIGS. 4 and 5, two circulating ring contacts 4.1, 4.2 are arranged on the underside of the angle-measuring instrument. These are used for working together with resilient contact elements (not represented) of a temperature outlet of the motor. Here, the angle-measuring instrument is designed in such a way that it can be flanged to the motor housing in different angular positions, depending on the required cable departure direction, but a contact with the signal outlets of the motor is still possible. In other words, the contact elements of the temperature outlet of the motor always encounter the ring contacts 4.1, 4.2 of the angle-measuring instrument regardless of the angular position in which the angle-measuring device had been flanged on the motor.

Each of the ring contacts 4.1, 4.2 is designed as a one-piece sheet metal element and they are provided with a gold plating. Sheet metal strips 4.11, 4.12 are aligned parallel with respect to the axis of the shaft 7, each of which is a component of the ring contacts 4.1, 4.2. The insulating body 4 is designed in such a way that it has an area 4.1 which is aligned parallel with respect to the axis of the shaft 7 inside the base body 3 and receives the sheet metal strips 4.11, 4.12. The sheet metal strips 4.11, 4.12 end at the printed circuit board 2 and are in contact there with corresponding strip conductors. The temperature signals are then further processed in appropriate circuits on the printed circuit board 2 and are output in the form of digital values, possibly also as analog signals, via the socket 2.1.

The foregoing description is provided to illustrate the invention, and is not to be construed as a limitation. Numerous additions, substitutions and other changes can be made to the invention without departing from its scope as set forth in the appended claims.

I claim:

1. An angle-measuring instrument, comprising
    a cap defining an opening;
    a base body that is covered by said cap;

a printed circuit board positioned on said base body and on which an electrical coupling element is fixed in place; and a spacer supported on said printed circuit board that aids in positioning said cap in such a way relative to said printed circuit board so that said opening is aligned with respect to said electrical coupling element, wherein said spacer is an integral component of said cap.

2. The angle-measuring instrument in accordance with claim 1, wherein said base body comprises a printed circuit board support, and said printed circuit board is arranged between said spacer and said printed circuit board support.

3. The angle-measuring instrument in accordance with claim 1, wherein an unequivocal assignment of a relative angular position between said cap and said base body is achieved by a positive connection.

4. The angle-measuring instrument in accordance with claim 3, wherein said base body and said cap are positively connected with each other.

5. The angle-measuring instrument in accordance with claim 3, wherein said cap comprises elements which work together with said printed circuit board in such a way that a relative angular position between said cap and said printed circuit board can be fixed by a positive connection.

6. An angle-measuring instrument, comprising:
   a cap defining an opening;
   a base body that is covered by said cap;
   a shaft rotatably seated in said base body;
   a code disk fastened on said shaft;
   a printed circuit board positioned on said base body and on which an electrical coupling element is fixed in place; and
   a spacer supported on said printed circuit board that aids in positioning said cap in such a way relative to said printed circuit board so that said opening is aligned with respect to said electrical coupling element, wherein said spacer is an integral component of said cap.

7. The angle-measuring instrument in accordance with claim 6, wherein said base body comprises a printed circuit board support, and said printed circuit board is arranged between said spacer and said printed circuit board support.

8. The angle-measuring instrument in accordance with claim 6, further comprising a detector located on said printed circuit board so as to receive position information from said code disk.

9. The angle-measuring instrument in accordance with claim 6, wherein an unequivocal assignment of a relative angular position between said cap and said base body is achieved by a positive connection.

10. The angle-measuring instrument in accordance with claim 9, wherein said base body and said cap are positively connected with each other.

11. The angle-measuring instrument in accordance with claim 9, wherein said cap comprises elements which work together with said printed circuit board in such a way that a relative angular position between said cap and said printed circuit board can be fixed by a positive connection.

\* \* \* \* \*